UNITED STATES PATENT OFFICE.

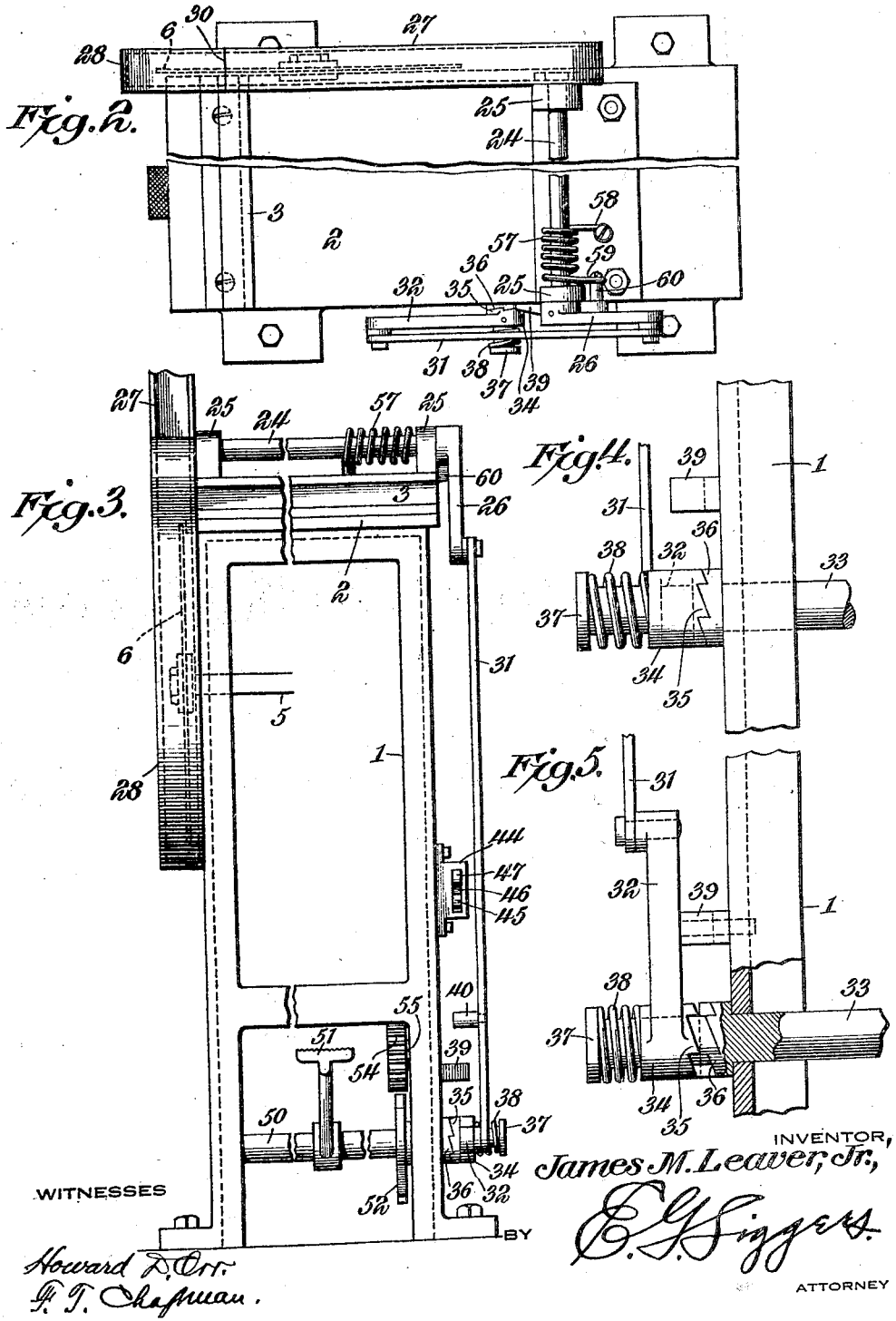

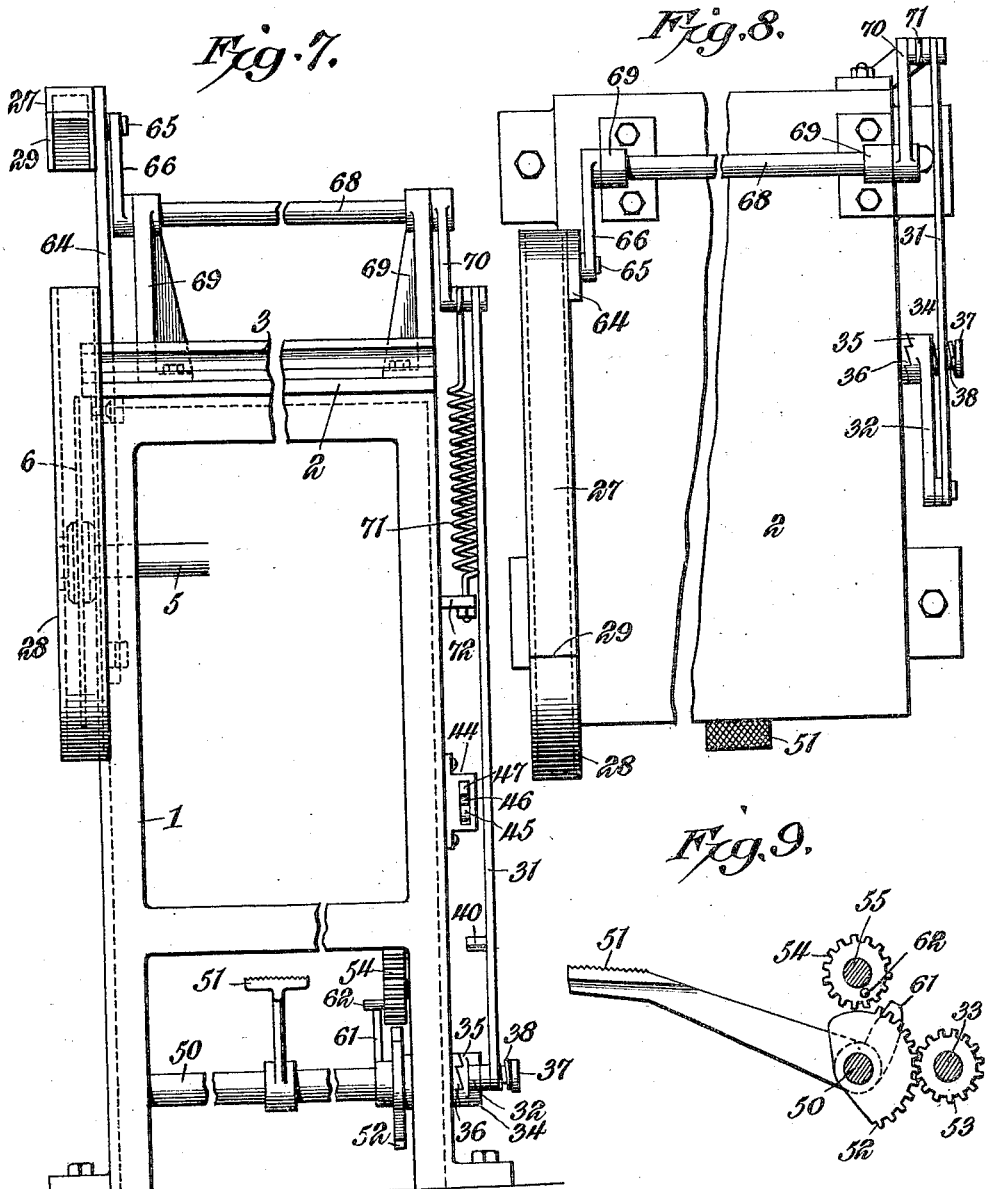

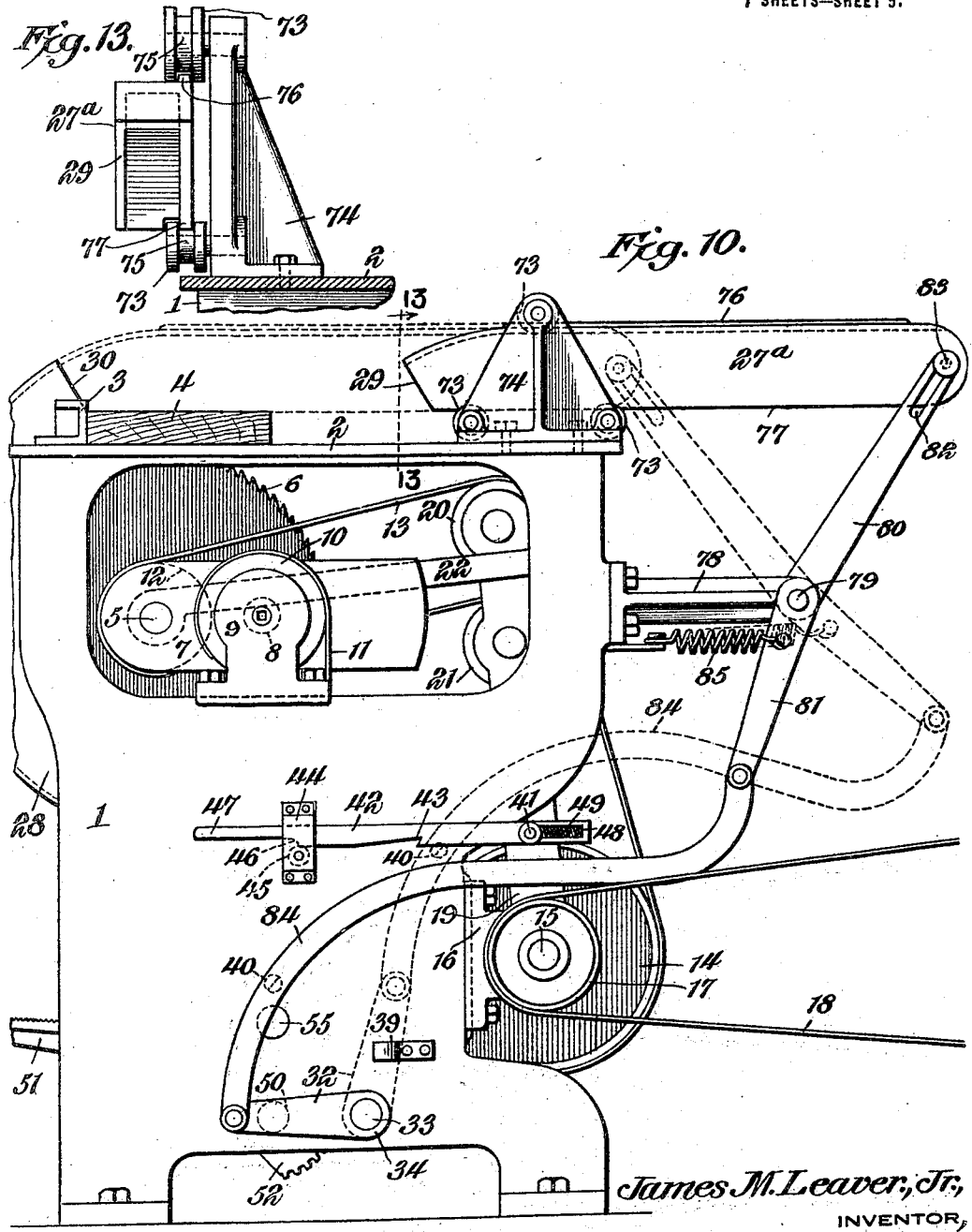

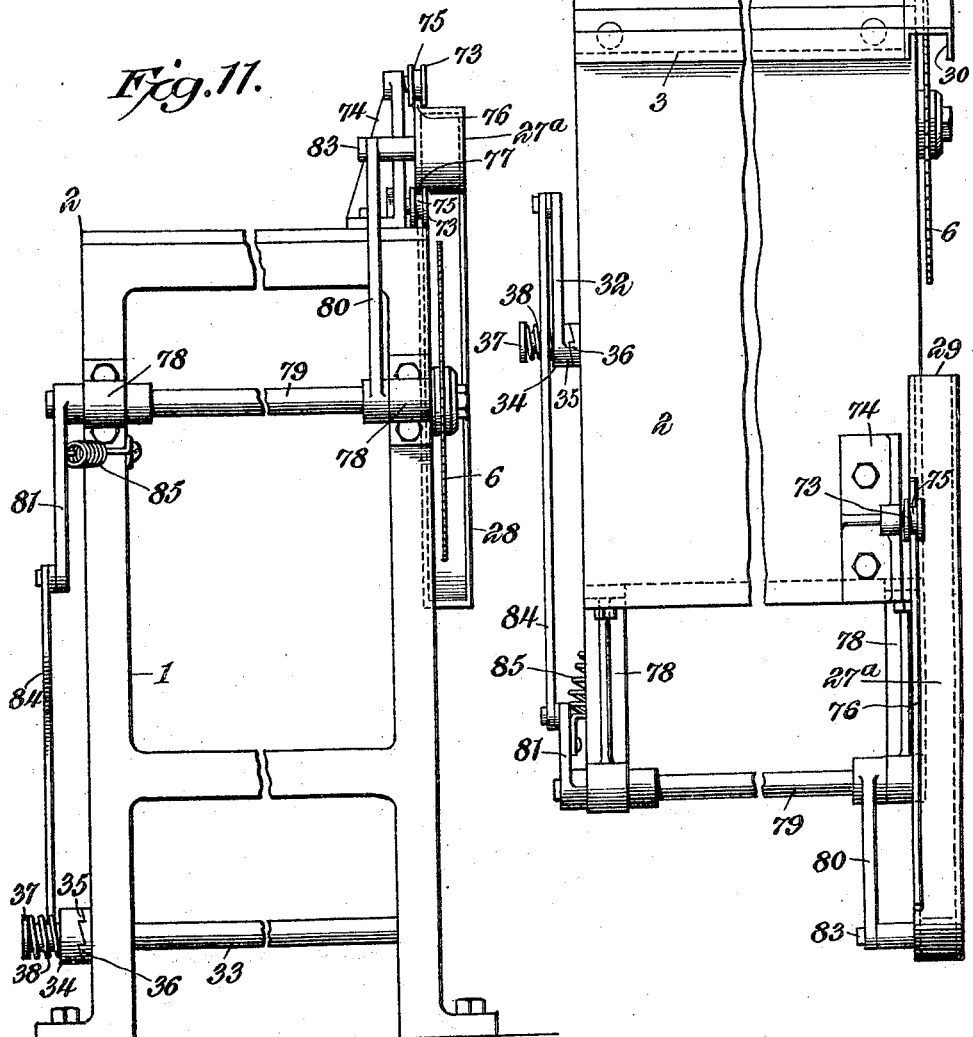

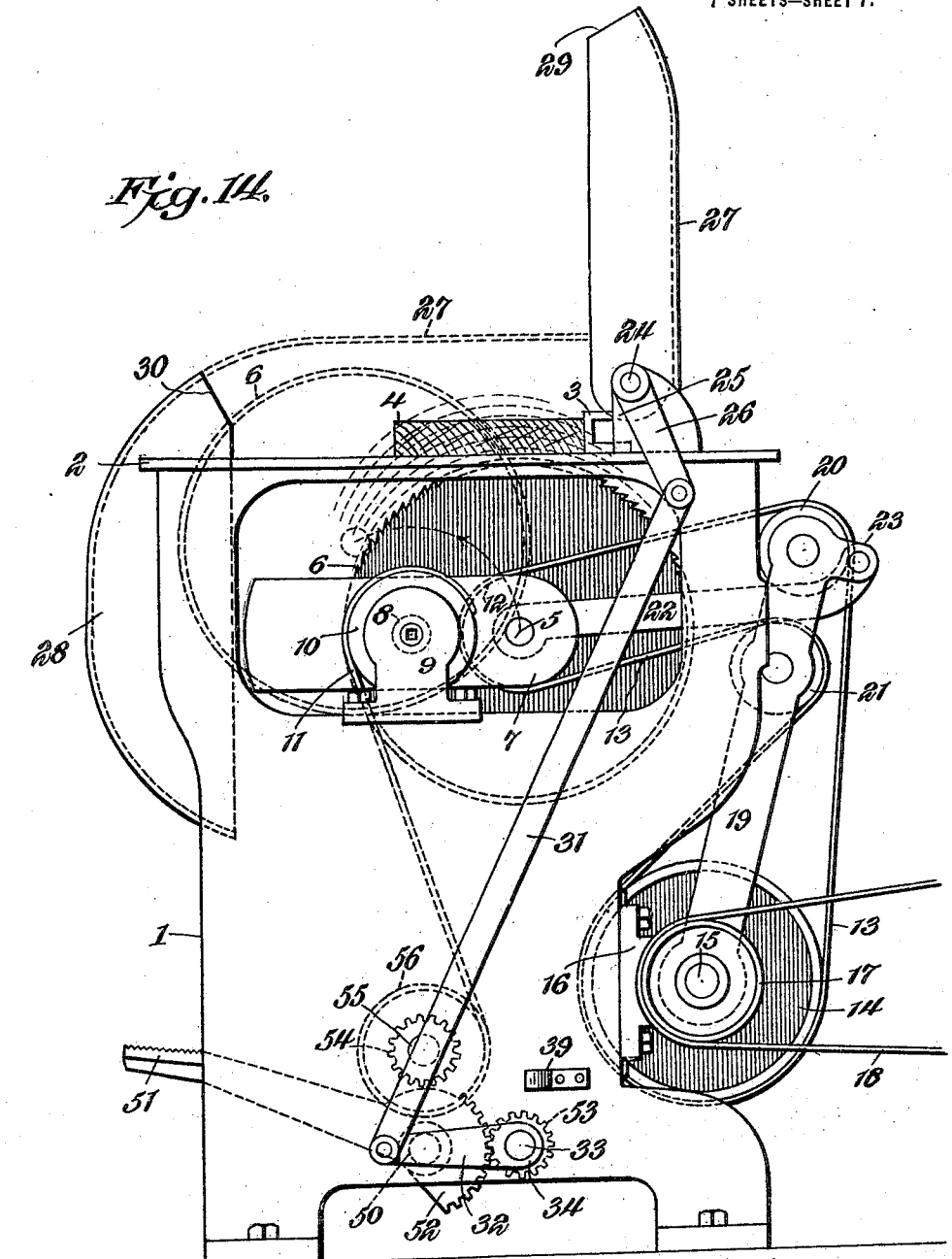

JAMES MARSHALL LEAVER, JR., OF OAKLAND, CALIFORNIA.

GUARD FOR CUT-OFF SAWS.

1,411,645.

Specification of Letters Patent. Patented Mar. 28, 1922.

Application filed April 14, 1917. Serial No. 162,084.

*To all whom it may concern:*

Be it known that I, JAMES M. LEAVER, Jr., a citizen of the United States, residing at Oakland, in the county of Alameda and State of California, have invented a new and useful Guard for Cut-Off Saws, of which the following is a specification.

This invention has reference to guards, particularly for cut-off saws, and its object is to provide a complete protection for an operator, so that liability of injury from the active saw is practically eliminated.

In accordance with the invention the saw is furnished with a guard, and both the saw and guard are bodily movable toward and from each other in such timed relation that the saw table is free from impediment to the placing of the work in a definite position, then the guard is moved into place so as to effectively protect the operator from the saw, and finally the saw is advanced to the work to cut the latter with the guard thoroughly protecting the operator from contact with the saw. In returning the parts to the first or inoperative position the saw and guard are moved in order with the saw being withdrawn so as to be out of position to harm the operator, and then the guard is moved in a direction to permit the work to be presented into position for action by the saw.

The arrangement is such that the timed relation of the saw and guard is always maintained, both the saw and guard moving toward and from operative position so that the operator at no time feeds the work to the saw and at no time can come in such exposed proximity to the saw as to be liable to injury therefrom.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 2 is a plan view of the machine of Figure 1.

Figure 3 is an elevation from the operator's side of the machine.

Figures 4 and 5 are detail views showing different positions of a clutch structure used in the machine.

Figure 7 is a view similar to Figure 3 but illustrating the guard shown in Figure 6.

Figure 8 is a plan view of the structure of Figure 6.

Figure 9 is a detail view of the operator's treadle and gearing associated therewith.

Figure 10 is a view similar to Figures 1 and 6 but showing still another form of guard.

Figure 11 is a view similar to Figures 3 and 7 but seen from the opposite side of the machine and illustrating the guard of Figure 10.

Figure 12 is a plan view of the machine of Figure 10.

Figure 13 is a detail section on the line 13—13 of Figure 10.

Figure 14 is a view similar to Figure 1 but showing the feed of the saw opposite to that of Figure 1.

Figure 1:
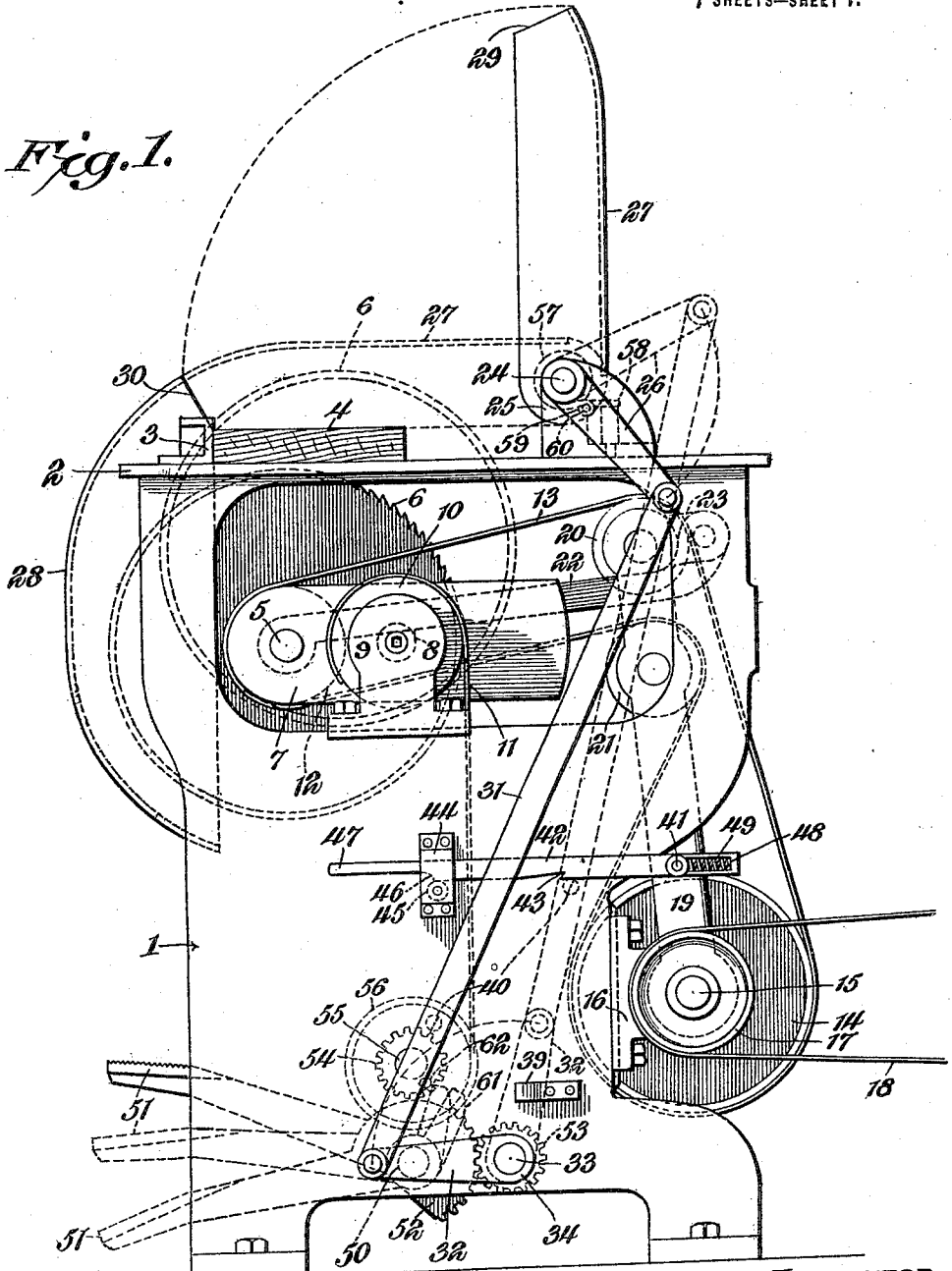
Figure 1 is an end elevation of a sawing machine with one form of guard applied.

Referring to the drawings there is shown a main frame 1 which may be of web and flange construction after the customary practice, or it may be made in any suitable manner for the purposes of the invention. The main frame carries a table 2 constituting the saw table.

On the table either near or opposite the operator's side thereof there is secured an elongated stop bar 3 against which the work to be cut is placed by the operator, such work being indicated at 4 in certain of the figures of the drawing.

There is provided a saw arbor 5 extending beyond one end of the frame 1 and there carrying a circular saw 6, which for the purposes of the invention is to be considered as a cross cut saw. The saw arbor is mounted on one end of each of two arms 7 carried intermediately of their length on journals 8 mounted in journal boxes 9. The arms 7 have the ends remote from the saw arbor so constructed as to overbalance the saw, thus imparting to it a tendency to rock upon the journals 8 as an axis. Fast to the journals 8 or to the arms 7, as the case may be, are pulleys or sprockets 10 to each of which is connected a strap or chain or other flexible strand 11.

Fast on the saw arbor is a pulley 12 driven by a belt 13 ultimately engaging another pulley 14 mounted on a shaft 15 carried by journal blocks 16 at a suitable portion of the frame 1, and preferably at a low part thereof. The shaft 15 carries another pulley 17 to be engaged by a drive belt 18 coming from a suitable source of power.

Rock arms 19 are mounted on and rise from the shaft 15 and carry other pulleys 20, 21 over which the belt 13 travels, and by means of which tension is imparted to the belt 13 to drive the saw under circumstances to be described.

Links 22 connect the saw arbor 5 to brackets 23 carried by the arms 19 near the upper ends of the latter, these arms being approximately upright in the showing of the drawings.

Mounted on top of the table 2 in the structure of Figure 1, near the end remote from the stop 3, is a rock shaft 24 journaled in journal bearings 25. One end of the shaft 24 extends beyond that side of the table 2 remote from the saw, and there has fast to it a rock arm 26, while at the other end of the shaft there is made fast to it a guard 27 of a length to extend to about the stop 3. Fast to the frame 1 is a fixed guard 28 so positioned as to permanently house a portion of the saw 6, the guard 28 being in an upright position on the operator's side of the frame 1 and of the table 2, so as to effectively protect the operator from engagement with the saw where covered by the permanent guard 28.

The guard 27 when moved to a substantially horizontal position has a free end 29 shaped to engage with a corresponding end 30 of the guard 28, and thus provide a continuous guard with the portion 27 overriding the saw. The movable guard 27, when in engagement with the upper end of the fixed guard 28, forms a substantially L-shaped guarding means for the saw.

In order to rock the guard 27 from an upright position as shown in full lines of Figure 1 to a substantially horizontal position as shown in dotted lines in Figure 1, there is provided a link 31 journaled at one end upon the free end of the rock arm 26. The link 31 is of a length to extend to near the bottom of the frame 1 at the side thereof remote from the saw and saw guard, and this link 31 is there pivoted to the free end of a rock arm 32 mounted on a shaft 33 extending through and journaled in the ends of the frame 1. The arrangement is such that when the guard 27 is upright the arm 26 approaches a pendent position and the arm 32 is then approximately horizontal.

The arm 32 is not permanently fast to the shaft 33, but is capable of rocking thereon, said arm 32 having a hub portion 34 formed at one end with ratchet teeth 35, while the shaft 33 has matching teeth 36, whereby the teeth 35 and 36 serve as a one-way clutch. The shaft 33 is extended beyond the hub 34 and there provided with a head 37 between which and the hub 34 the shaft carries a spring 38 tending to force the teeth 35 into engagement with the teeth 36.

Mounted on the frame 1 in the path of the arm 32 as it approaches an upright position is a block 39 so positioned that when the arm 32 is moved toward the upright position it will engage the wedge block 39, whereby the teeth 35 are moved away from the teeth 36. The parts are so proportioned that this occurs just as the arm 32 and the link 31 come into alinement, and the end 29 of the guard 27 meets the end 30 of the guard 28. The result is that because of the alinement of the link 31 with the arm 32 there is provided an automatic lock holding the guard 27 in the lowered or active position. The link 31 is provided with a projecting stop 40, and pivoted by a pivot pin 41 or otherwise to the arm 19 is a bar 42 having a notch 43 in the path of the pin 40. The bar 42 has the end remote from the pivot 41 extended through a guide strap 44 fast to the frame 1, and this strap houses a roller 45 in position to engage behind a shoulder 46 formed in one edge of the bar 42, while said bar is extended into a manipulating handle 47 for a purpose to be described. The bar 42 is provided with a longitudinal slot 48 for the pin 41, and between the pin 41 and the end of the slot 48 remote from the handle 47 there is lodged a spring 49 tending to yield to movement of the arm 19 with reference to the bar 42.

Journaled in the frame 1 at a suitable low point thereof is another rock shaft 50 provided with a treadle 51 projecting on the operator's side of the frame 1. The shaft 50 has fast thereto a gear segment 52 normally in mesh with a pinion 53 on the shaft 33. In the path of the teeth of the segment 52 is another pinion 54 on a shaft 55 journaled in the frame 1 and carrying pulleys or sprockets 56, to which the flexible strands 11 are made fast, it being assumed that there are two such strands, although it is immaterial for the purposes of this invention whether one or two strands be used.

Coiled about the shaft 24 is a spring 57 having one end 58 fast to the table 2 or some other fixed part of the machine, while the other end 59 of the spring is secured to a pin 60 projecting from the arm 36, the arrangement being such that the spring 57 tends at all times to lift the guard 27 and is placed under superior tension when the guard is lowered, wherefore as soon as the lock between the arm 32 and link 31 is broken by moving these parts out of alinement, the spring 57 will raise the guard.

The gear segment or quadrant 52 has fast thereto a finger 61 so positioned as to engage a pin 62 on the pinion 54, thus insuring the proper meshing of the teeth of the segment 52 with the teeth of the pinion 54, since in the normal position of the parts the teeth of the segment 52 are spaced some distance from the pinion 54 and in the absence of the finger 61 and pin 62 might fail to properly mesh.

Figure 6:
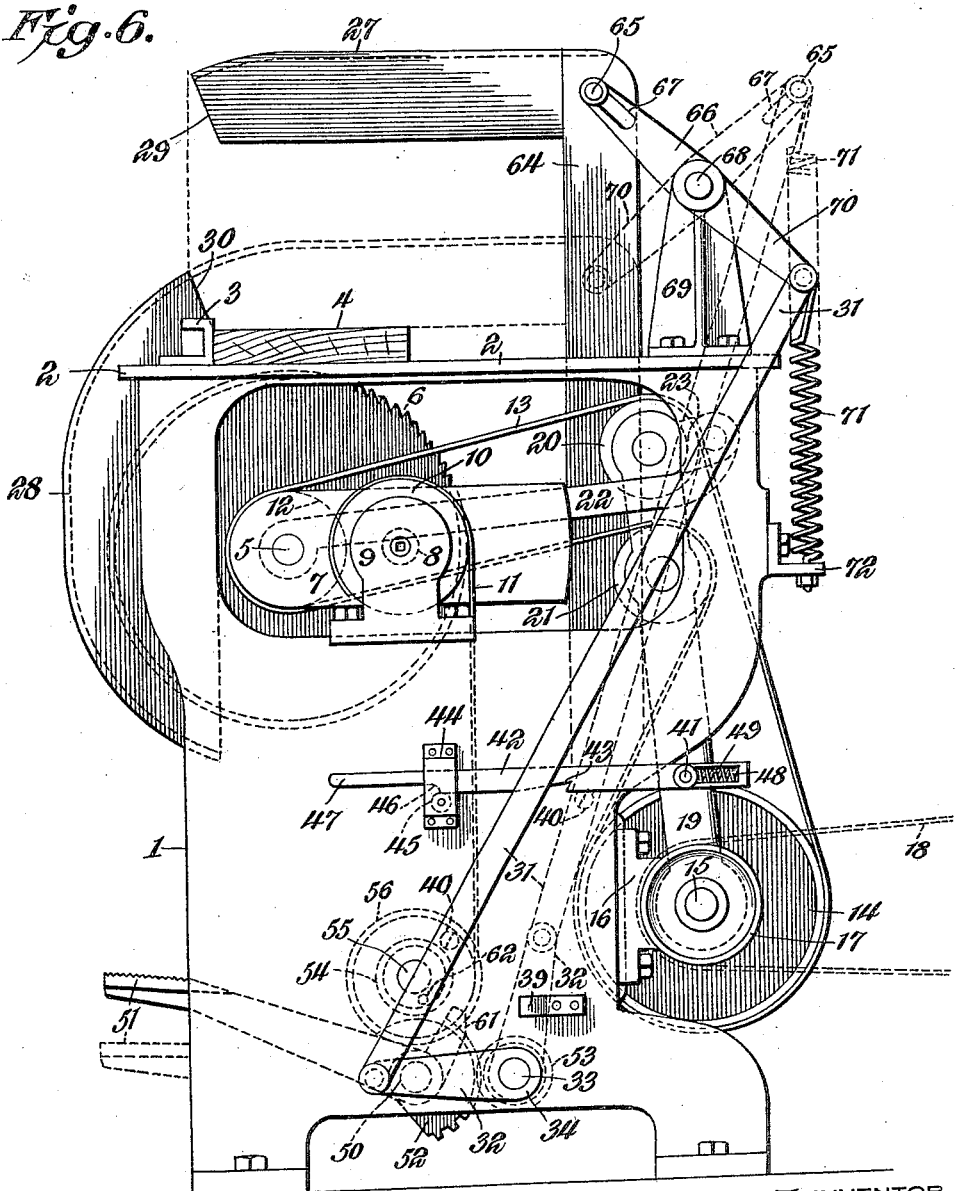
Figure 6 is a view similar to Figure 1 but showing another form of guard.

The description has so far been applied in the main to the structure of Figure 1, but in many respects will apply equally well to the structures of Figures 6 and 10, and in so far as the structures are alike the same reference numerals are applied.

The structures of Figures 1, 6 and 10 differ in the form of saw guard, and such structural changes as are necessary to adapt the machine for the different forms of saw guard. In all forms of the invention, a movable guard section cooperates with a fixed guard section, the former lying wholly above the saw table and movable toward and from the work.

To facilitate the understanding of the structures of Figures 6 and 10 the operation of the machine of Figure 1 will first be described.

When the parts are in the position shown in full lines in Figure 1 with the saw lowered below the level of the top of the table 2 and with the guard 28 protecting the operator from possible contact with the saw at the operator's side of the machine, access is had to the top of the table because in such position of the parts as shown in full lines in Figure 1 the guard 27 is well out of the way, being then in a substantially upright position.

The operator places the work 4 from which it is desired to cut off a piece on the table and adjusts it against the stop 3. Now, the operator by pressing his foot upon the treadle 51 lowers the latter, causing the segment 52 to rotate the pinion 53, thus swinging the arm 32 toward the upright position, raising the link 31 and thereby rocking the arm 26 in a direction to lower the guard 27 on to the work 4, thereby clamping the work and at the same time bringing the guard directly over the saw, so that it constitutes a continuation of the guard 28 and covering the saw from possible contact therewith by the operator. As soon as this action of the parts is completed the wedge block 39 disconnects the arm 32 from shaft 33 and then a further depression of the treadle 51 causes the segment 52 to mesh with the pinion 54, the proper meshing of the teeth being insured by the finger 61 and pin 62, whereupon a rotative movement is imparted to the shaft 55 and the pulley or pulleys 56 carried thereby. This causes the winding of the strand 11 upon the pulley 56 and a corresponding turning of the pulley 10, with the result that the arms 7 are rocked in a manner to raise the saw arbor 5 and saw 6 about the axis of the shaft 8 as shown in dotted lines, Figs. 1 and 14. The saw being assumed to be in rotation, is carried upwardly and horizontally through the work then clamped upon the table 2, and the work is severed as desired. The saw, however, is at the time covered by the guard 27, which also serves as a clamp and the saw is both out of sight and out of reach of the operator. The guard covers the saw blade in its full length of stroke and works with reference to the horizontal movement of the saw.

When the saw is elevated as described, the links 22 move with the saw arbor in a direction to rock the arms 19, so as to maintain the belt 13 taut, or to bring it into such taut position as to rotate the saw in the same manner as occurs when a belt tightener is used. The rocking of the arms 19 causes a corresponding movement of the rod 42 which at the time is underridden by the pin 40, and this rod is moved until the notch 43 engages behind the pin 40 and the shoulder 46 engages behind the roller 45. When the operator releases the pedal 51 the return of the saw to the lower position causes the arms 19 to swing in a direction to move the rod 42 so as to engage the pin 40 and push the link 31 out of alinement with the arm 32, thus breaking the lock and at the same time the shoulder 46 rides up over the roller 45, thus lifting the rod 42 away from the pin 40. The return movement is then completed by the spring 57 raising the guard 27, while the saw and parts associated therewith all return to the first position.

The arrangement is such that the parts all act in timed relation and there is a certain sequence of action. Before the work is placed on the table the treadle 51 may be assumed to be in the raised or full-line position in Figure 1. Then after placing the work the first movement of the treadle under the impulse imparted thereto by the operator is to bring the guard 27 into clamping relation to the work and in covering relation to the path of the saw. After this is accomplished a further downward movement of the treadle results in raising of the saw to cut through the work and to enter as far as need be into the guard 27, which at all times while the saw is at work protects the operator from any harm whatever. The return movements of the parts to normal or inoperative position is in reverse sequential order.

It is an important feature of the invention that the guard is in the completely closed or protective position before the saw starts toward the work or completes its forward action. In other words, the guard is moved down over the work prior to any action or movement of the saw and independently of the saw. It is set and locked before any movement of the saw can take place. The complete covering or housing of the saw in its travel eliminates all possibility of accident.

The guard not only acts in its protective feature, but serves as a clamp for holding the work and as a cutting anvil, when the saw is so arranged as to move upwardly to the work, thus preventing the work from being disturbed. Furthermore, the guard serves as a sawdust hood, greatly facilitating the removal of sawdust by suction apparatus such as is customarily employed.

Since the arms between the treadle and the saw guard and between the treadle and the saw feeding means may be set at any desired angle, the parts may be made to act to each perform its full operation before the next part comes into operation, or these operations may be made to overlap more or less. The full operation of the saw guard before the saw itself is brought into action is the preferable one. It should be noted that foot pressure provides the power required to operate the guard before any power is required to operate the saw, thereby providing two independent operations and insuring the full pressure of the foot to operate the saw.

While in Figure 1 the arrangement is such that the saw in its active movement travels upwardly, it will be understood that the same principles may be applied to a machine in which the saw is caused to travel in other paths.

Nor is it necessary that the saw guard operate from what may be termed the rear of the machine, this being the portion of the machine remote from the operator, since the guard may be caused to operate in other directions as may be found advisable by the manufacturer, or to suit ideas of the operator.

While the machine is shown as under the control of an operator through the medium of a treadle, other means may be employed for causing the movements of the saw and guard to accomplish the purposes of the invention.

Instead of employing a swinging guard as shown in Figure 1 and associated figures, the guard 27 may be mounted on the upper end of an upright slide 64 connected by a pin 65 on the slide 64 to a rock arm 66 through an elongated and longitudinally extended slot 67 in the arm. There is also provided a rock shaft 68 journaled on pedestals 69 erected on the table 2 at an appropriate part thereof, and the rock shaft 68 carries another arm 70 which may be located at the end of the shaft remote from the arm 66. The arm 70 has the link 31 fast thereto and the remainder of the mechanism for operating the link and saw may be the same as in Figure 1. Instead of providing a spring like the spring 57 of the structure of Figure 1 for returning the guard to the open or inoperative position, there is provided a spring 71 fast at one end to the arm 70 and at the other end to a bracket 72 on the frame 71, the tendency of the spring 71 being the same as the spring 57 of Figure 1. The only difference in action between the structure of Figure 6 and Figure 1 is that the guard 27 moves in a straight line toward and from the work 4 instead of swinging in an arc.

In the structure of Figure 10 there is provided a guard 27ª somewhat longer than the guard 27 of either Figure 1 or Figure 6, and this guard is mounted upon guide rollers 73 carried by a bracket 74 erected on the table 2. A triangular arrangement of the rollers 73 is sufficient to guide and sustain the guard 27ª in movements lengthwise of the guard, and these rollers 73 have peripheral grooves 75 therein engaging flanges 76, 77 lengthwise of the guard 27ª at one side thereof.

A bracket 78 is made fast to the frame 1 below the guard 27ª and this bracket carries a rock shaft 79 with oppositely directed arms 80, 81, respectively, the arm 80 having near its free end a longitudinal slot 82 through which projects a pin 83 on the guard 27ª. The free end of the arm 81 is connected by an appropriately shaped link 84 in turn connected to the arm 32. A spring 85 connected at one end to the arm 81 and at the other end to a fixed part of the frame 1 serves the same purpose as the spring 57 of Figure 1.

The structure shown in Figure 14 is substantially the same as that described with reference to Figure 1, wherefore the same reference numerals are used. The only difference is that the stop 3 and the saw 6 in its retracted position are on the side of the table 2 remote from the operator. The operation of the saw and guard is the same as in Figure 1, except that the saw is fed toward the operator instead of away from him and the operator must reach across the table 2 to place the work against the stop 3.

It will be understood from the showing of Figure 14 that the feed of the saw and the location of the work stop may be similarly changed in the structures of Figures 6 and 10. Furthermore, some or all of the guard features are capable of incorporation in other forms of saw machines than those shown in the drawings.

No claim is made in this application to the structure of the saw machine per se, since such machine is shown, described and claimed in another application, Serial No. 165,174, filed April 28, 1917, for intermittent and oscillatory cut off saw machine.

What is claimed is:—

1. A sawing machine provided with a saw and a guard therefor, and manipulating means for and common to the saw and guard for moving them toward and from work located on the machine, said manipulating means including separate and independent connections to the saw and guard respectively, whereby either the saw or the guard may be moved by the manipulating means toward or from the work without moving the other.

2. A sawing machine provided with a saw and a guard therefor, and manipulating means for and common to the saw and guard for moving them toward and from work located on the machine, said manipulating means including separate and independent connections to the saw and guard respectively, and the connections to the guard including means for locking the latter in holding relation to the work, whereby either the saw or the guard may be moved by the manipulating means toward and from the work without moving the other, with the guard held against movement while the saw is moving toward and from the work.

3. A sawing machine provided with a saw and a guard therefor, and manipulating means for and common to the saw and guard for moving them toward and from work located on the machine, said manipulating means including separate and independent connections to the saw and guard respectively, with the connections timed in operation to move the guard and saw in sequence by a progressive movement of the manipulating means with the guard completing its movement toward the work prior to the starting of the saw toward the work.

4. A sawing machine provided with a saw and a guard therefor, a treadle, connections to the guard controlled by the treadle for moving the guard into position to hold work on the machine, and other connections controlled by the treadle for moving the saw into engagement with the work, the actuation of the guard and saw by the treadle being timed to act in sequence with the full movement of the guard into holding relation to the work completed before the engagement of the saw with the work.

5. A sawing machine provided with a saw and a guard therefor, and means in part common to both and in part individual to each for moving them toward and from work on the machine, the part of the moving means individual to the guard having locking connections for temporarily retaining it in fixed position against the action of the saw on the work prior to the engagement of the saw with the work.

6. A sawing machine provided with a saw and a guard therefor, and manipulating means for and common to the saw and guard for moving them toward and from work located on the machine, said manipulating means including separate and independent connections to the saw and guard respectively, with the connections timed in operation to move the guard and saw in sequence by a progressive movement of the manipulating means with the guard completing its movement toward the work prior to the starting of the saw toward the work, and means for locking the guard when in its position over the saw, said locking means being actuated so as to lock the guard before any movement of the saw.

7. A sawing machine provided with a saw and a guard therefor, manipulating means for the saw and guard for first moving the guard over work located on the machine, and after the guard has completed its movement, then starting the saw toward the work, and locking means for holding the guard when in its position over the saw, said locking means being automatically actuated so as to lock the guard before any movement of the saw takes place.

8. A sawing machine provided with a saw and a guard therefor, manipulating means for the saw and guard for first moving the guard over work located on the machine, and after the guard has completed its movement, then starting the saw toward the work, locking means for holding the guard when in its position over the saw, said locking means being automatically actuated so as to lock the guard before any movement of the saw takes place, and resilient means placed under tension when the guard is in locked position over the saw, whereby when the locking means is released the resilient means will move the guard away from the work.

9. A sawing machine provided with a saw and a guard therefor, and means for moving the saw and the guard toward and from work on the machine, said means including means timed to cause the guard to clamp the work and lock the guard before any movement of the saw toward the work takes place.

10. A sawing machine provided with a saw and a guard therefor, both movable toward and from work located on the machine, the guard having means for causing its movement into clamping engagement with the work and there temporarily locking it, and the saw having means for moving it after the guard has been locked toward the work and timed to move toward the work after the guard has clamped it and to recede from the work before the guard moves away from the work.

11. A sawing machine provided with a saw guard movable into and out of engagement with work on the machine and provided with means for positively locking the guard in temporary clamping engagement with the work with the clamping action in opposition to the cutting action of the saw on the work and resilient means placed under tension when the guard is in clamping engagement with the work, whereby when the locking means is released the guard is caused to automatically move away from the work.

12. A sawing machine provided with a work support, a saw movable toward and from work on the support, and a guard movable in opposition to the movement of the saw into clamping engagement with the work. said saw and guard having means individual thereto and other means operating in common on the individual means for imparting the named movements in timed relation to cause the guard to clamp the work before the saw partakes of any movement whatsoever.

13. A sawing machine provided with a work support, a saw movable toward and from work while on the support, a guard for the saw movable toward and from the work into and out of covering relation to the saw, and means for causing the full movement of the guard toward the work to precede the movement of the saw toward the work, and the full movement of the saw from the work to precede movement of the guard from the work.

14. A sawing machine comprising a work support, a saw movable toward and from the work, a guard movable toward and from the work, and actuating means for causing the named movements of the saw and guard comprising a device under the control of an operator, connections from the device to the saw for moving the latter toward and from the work, and other connections separate from the saw moving connections and extending from the device to the guard, said last named connections including a self-locking portion and a throw-off portion with the parts timed in action to cause the guard to engage the work and lock in clamping relation thereto and the saw to then engage the work, and the parts to operate in the reverse order on the return of the device controlled by the operator to the first position.

15. In a sawing machine, a saw having a course of travel through work first in a rising direction and then crosswise of the work, and a guard for the saw of a length to cover the saw throughout the full extent of travel of the saw while engaging the work.

16. In a sawing machine, a support for the work, a saw normally hidden below the work supporting surface of the support and having a course of travel upwardly through and crosswise of the work, and a guard movable toward the work into holding relation thereto in opposition to the movement of the saw through the work, said guard being of a length to cover the saw during and throughout the full extent of travel of the saw upwardly through and crosswise of the work.

17. In a sawing machine, a support for the work, a saw normally hidden below the work supporting surface of the support and having a course of travel upwardly through and crosswise of the work, and a guard movable toward the work into holding relation thereto in opposition to the movement of the saw through the work, said guard being of a length to cover the saw during and throughout the full extent of travel of the saw upwardly through and crosswise of the work, and means having connections with the saw and with the guard timed in operation to complete the movement of the guard into fixed holding relation to the work before the saw engages the work and to retain the holding position until the saw has been withdrawn to its first position.

18. A sawing machine provided with a saw and a guard therefor, manipulating means for moving the saw and guard toward work located on the machine, means for locking the guard when in covering relation over the saw, and means independent of said locking means for raising the guard from the work when released from said locking means.

19. A sawing machine provided with a saw and a guard therefor, a treadle, connections to the guard controlled by the treadle for moving the guard into position over the saw, other connections also controlled by the treadle for moving the saw into engagement with the work, and means whereby the full power of the treadle is utilized to first operate the guard and when the guard is moved into position the full power of the threadle is then used to operate the saw, both operations being independent but produced by the progressive movements of the treadle.

20. A sawing machine provided with a saw and a guard therefor, a treadle, connections to the guard controlled by the treadle on its initial movement for moving the guard into position over the saw, and other connections controlled by the treadle on its second movement for moving the saw into engagement with the work, whereby the treadle effects the movements of the guard and saw in sequence by two different operations so as to insure the full pressure of the foot for each operation.

21. A sawing machine provided with a saw and a guard therefor, a treadle, connections to the guard controlled by the treadle for moving the guard into position over the saw, other connections also controlled by the treadle for moving the saw into engagement with the work, the connections to the guard including means for locking the latter in its active position, the actuation of the guard and saw by the treadle being timed to act in sequence, with the full movement of the guard completed and the guard locked in position before any movement of the treadle effects the movement of the saw, thereby releasing the full foot pressure on the treadle to act on the connections in moving the saw.

22. A sawing machine comprising a saw table with means for positioning the work thereon, a saw mounted for movement toward and from work on the table, a saw guard movable toward and from the work on the table and when moved toward the work engaging and clamping the latter and then positioned to be in the path of the saw engaging the work to cover said saw, a manipulating member under the control of an operator, connections between the manipulating member and the saw for causing movements of the latter toward the work, rock arms with one connected to the guard for actuating the latter and the other having connection with the manipulating member for actuation by the latter, a link connection between the rock arms with one of the rock arms and the link movable into locking alinement when the guard is in engagement with the work, and means for throwing the second-named rock arm and the manipulating member out of connection when the guard is in locked position, the manipulating member being timed in relation to the saw and guard to cause the movement of the guard to locked position prior to the movement of the saw into engagement with the work.

23. A sawing machine provided with a saw having means for moving it toward and from work located on the machine, and a guard for the saw having means for moving it toward and from the work located on the machine and including a link connected at one end to the guard, a rock arm connected to the other end of the link, a shaft carrying the rock arm, a treadle lever, gearing between the treadle lever and the shaft carrying the rock arm, clutch means between the rock arm and the shaft carrying it, and a wedge device in position to engage the rock arm and disengage the clutch means when the rock arm and link are in substantial alinement.

24. A sawing machine provided with a saw having means for moving it toward and from work located on the machine, and a guard for the saw having means for moving it toward and from the work located on the machine and including a link having connections at one end to the guard, a rock arm connected to the other end of the link, a shaft carrying the rock arm, a treadle lever, gearing between the treadle lever and shaft carrying the rock arm, clutch means between the rock arm and the shaft carrying it, and a wedge device in position to engage the rock arm and disengage the clutch means when the rock arm and link are in substantial alinement, the rock arm having a spring associated therewith yieldable to the action of the wedge device and normally tending to maintain the clutch in the engaged position.

25. In a sawing machine, a saw having means for moving it toward and from work located on the machine, a treadle lever, connections between the treadle lever and saw for feeding the latter to the work, said connections including gearing with one member in the form of a gear segment movable with the treadle, a guard for the saw movable toward and from the work located on the machine, and means for operating the guard by the treadle, comprising a rock arm connected to the guard, a link connected at one end to the rock arm, another rock arm connected to the other end of the link, a rock shaft carrying the second named rock arm, clutch connections between the second named rock arm and the rock shaft, gear connections between the rock shaft and the gear segment, and means to open the clutch when the second named rock arm and link are alined.

26. In a sawing machine, a saw having means for moving it toward and from work located on the machine, a treadle lever, connections between the treadle lever and saw for feeding the latter to the work, said connections including gearing with one member in the form of a gear segment movable with the treadle, a guard for the saw movable toward and from the work located on the machine, and means for operating the guard by the treadle, comprising a rock arm connected to the guard, a link connected at one end to the rock arm, another rock arm connected to the other end of the link, a rock shaft carrying the second named rock arm, clutch connections between the second named rock arm and the rock shaft, gear connections between the rock shaft and the gear segment, and means for moving said rock arm to open the clutch when the second named rock arm and link are alined, the gear segment and gear connected to the saw for feeding it being related to cause the movement of the guard into locked guarding position before the saw is fed to the work.

27. In a sawing machine, a saw having means for moving it toward and from work located on the machine, a treadle lever, connections between the treadle lever and saw for feeding the latter to the work, said connections including gearing with one member in the form of a gear segment movable with the treadle, a guard for the saw movable toward and from the work located on the machine, and means for operating the guard by the treadle, comprising a rock arm connected to the guard, a link connected at one end to the rock arm, another rock arm connected to the other end of the link, a rock shaft carrying the second named rock arm, clutch connections between the second named rock arm and the rock shaft, gear connections between the rock shaft and the gear segment, means for moving said rock arm to open the clutch when the second named rock arm and link are alined, the gear segment and gear connected to the saw for feeding it being related to cause the movement of the guard into locked guarding position before the saw is fed to the work, throw-off means for breaking the lock of the guard, and means associated with the saw feeding means for causing the operation of the lock throw-off means on the return of the saw to normal position.

28. In a sawing machine, a saw having means for moving it toward and from work located on the machine, a treadle lever, connections between the treadle lever and saw for feeding the latter to the work, said connections including gearing with one member in the form of a gear segment movable with the treadle, a guard for the saw movable toward and from the work located on the machine, and means for operating the guard by the treadle, comprising a rock arm connected to the guard, a link connected at one end to the rock arm, another rock arm connected to the other end of the link, a rock shaft carrying the second named rock arm, clutch connections between the second named rock arm and the rock shaft, gear connections between the rock shaft and the gear segment, means for moving said rock arm to open the clutch when the second named rock arm and link are alined, the gear segment and gear connected to the saw for feeding it being related to cause the movement of the guard into locked guarding position before the saw is fed to the work, throw-off means for breaking the lock of the guard, and means associated with the saw feeding means for causing the operation of the lock throw-off means on the return of the saw to normal position, said throw-off means comprising a rockable arm movable by the feed of the saw, a notched bar connected to and movable with the arm, and a pin on the link in the path of the notched bar.

29. In a sawing machine, a saw having means for moving it toward and from work located on the machine, a guard movable toward and from said work, a treadle, connections between the treadle and the saw for feeding the latter to the work, means for operating the guard from the treadle, said means including a locking device for the guard for holding it in its active position, and a throw-off means for breaking said locking device, said throw-off means being actuated by the return of the saw to normal position.

30. In a sawing machine, a saw having means for moving it toward and from work located on the machine, a guard movable toward and from said work, a treadle, connections between said treadle and the saw including a gear, and other connections between said treadle and the guard including another gear, said treadle having a gear which is normally in mesh with the last-mentioned gear and movable into meshing engagement with the first-mentioned gear to first move the guard to active position and then move the saw towards the work.

In testimony that I claim the foregoing as my own, I have hereto affixed my signature in the presence of two witnesses.

JAMES MARSHALL LEAVER, Jr.

Witnesses:
J. L. BANE,
F. WALFORD.